R. B. FORSYTH.
PULSATOR FOR MILKING MACHINES.
APPLICATION FILED FEB. 25, 1914.
1,257,688.
Patented Feb. 26, 1918.
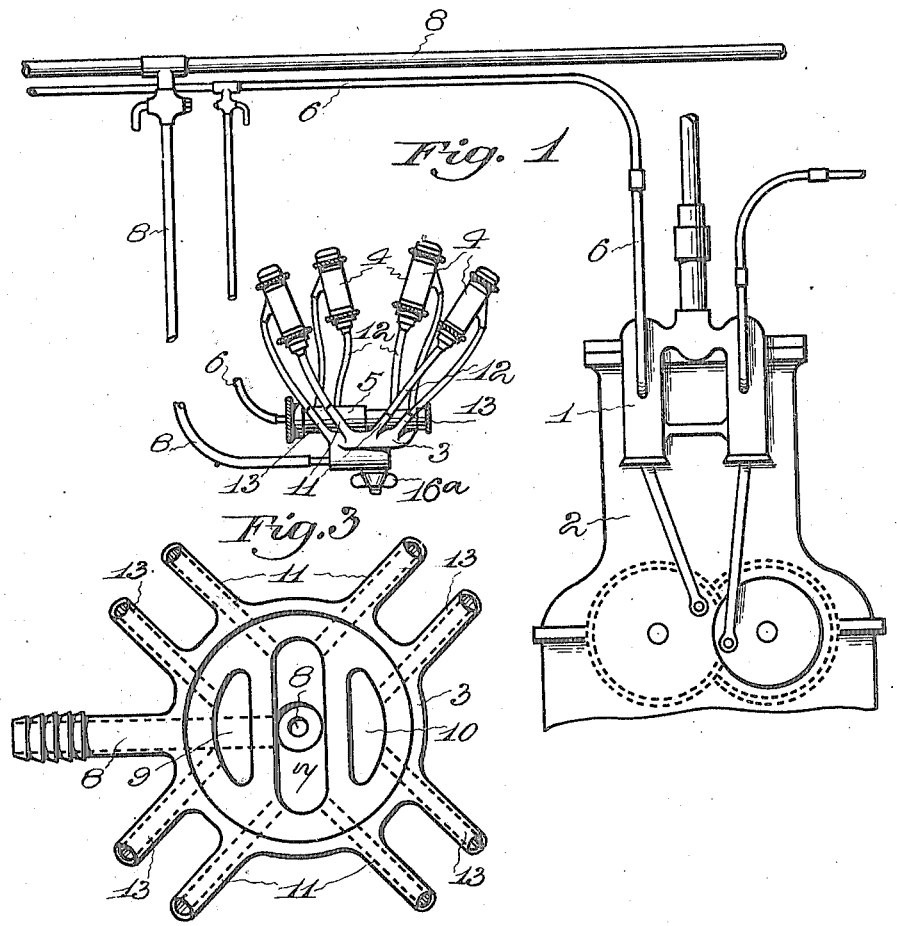
Fig. 1
Fig. 3
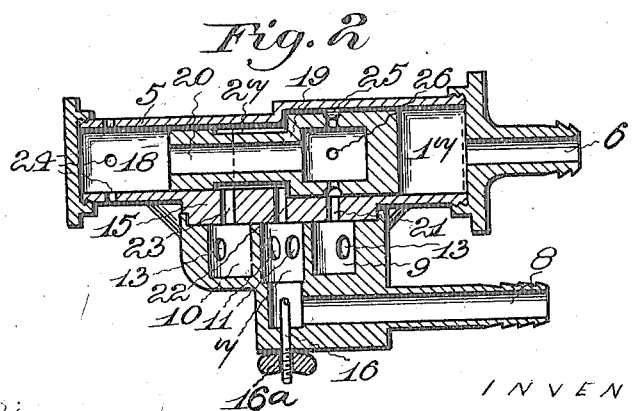
Fig. 2
WITNESSES:
INVENTOR:
Robert Bruce Forsyth
By Wallace White
ATTY

UNITED STATES PATENT OFFICE.

ROBERT BRUCE FORSYTH, OF CHRISTCHURCH, NEW ZEALAND, ASSIGNOR, BY MESNE ASSIGNMENTS, TO THE DE LAVAL SEPARATOR COMPANY, OF NEW YORK, N. Y., A CORPORATION OF NEW JERSEY.

PULSATOR FOR MILKING-MACHINES.

1,257,688.  Specification of Letters Patent.  Patented Feb. 26, 1918.

Application filed February 25, 1914. Serial No. 820,851.

*To all whom it may concern:*

Be it known that I, ROBERT BRUCE FORSYTH, a subject of the King of Great Britain, residing at 189 Cashel street, Christchurch, in the Dominion of New Zealand, have invented new and useful Improvements in and Relating to Pulsators for Milking-Machines, of which the following is a specification.

This invention relates to pulsators for use with milking machines of the type in which the teat-cups are provided with a collapsible lining which divides them into two chambers, viz., an inner or suction chamber adapted to receive the teat and to convey the milk therefrom to the milk-pipe; and an outer or pulsation chamber comprising the annular space between such collapsible lining and the outer shell of the teat-cup.

Hitherto, in cases where the milk is lifted to any height it has been the practice to position the pulsator above or at some distance from the teat-cups, which arrangement however necessitates the use of a length of pipe to connect the pulsator with such teat-cups which tends to reduce the efficiency of the pulsation.

Again in machines of this nature in which separate pipes are employed for the milk and pulsation, it has been found that although at the pump end the initial vacuum of the milk-pipe and the maximum vacuum of the pulsation pipe are equal, yet, owing to the weight of milk in the milk-pipe, the vacuum at the suction-chamber of the teat-cup will be less than the maximum vacuum in the pulsation-chamber. This excess of vacuum in the pulsation-chamber over that of the suction-chamber, has the effect of drawing the collapsible lining too far away from the teat and thus impairs the milking action.

Again in milking machines of this type; i. e., those in which the milk is drawn by subjecting the teat to a combination action of suction and pulsation, such suction has, in most cases, been produced by maintaining a uniform vacuum in the suction-chamber throughout the milking operation. This uniformity of the vacuum however has the effect of producing a very severe squeeze upon the teat at the point in the pulsation when air is admitted to the pulsation-chamber, with the result that such teat is liable to become numb. In addition to this there is the further objection that the uniform suction is very liable to fatigue the teat.

It is the object of the present invention, therefore, to overcome the above mentioned defects by providing a construction wherein the distance through which the pulsation will require to be transmitted to the teat-cup will be reduced to a minimum; the vacuum in the two chambers of the teat-cup will be equalized; and the degree of vacuum of the suction chambers will be reduced momentarily at the required stage in the pulsation.

A further object of the invention is to provide a claw or connecting member for the teat-cups, of such construction as to facilitate cleaning and to provide for the flexible connections to the teat-cups leading away as nearly straight as possible.

In carrying the invention into effect the construction consists briefly in the employment of a primary pulsation for the purpose of actuating a pulsator mounted upon the claw, such claw-pulsator being adapted, in response to the primary pulsation, to produce a secondary pulsation by placing the pulsation-chambers of the teat-cups alternately in communication with the atmosphere and with the vacuum of the milk-pipe.

The said secondary pulsator is moreover so arranged as to produce a differential pulsation, that is to say, a certain number of the teat-cups in the set will be in communication with the amosphere at the time when the remainder are under vacuum.

In order that the nature of the invention and its construction may be fully understood, reference will now be made to the accompanying sheet of drawings in which—

Figure 1:— is a general view illustrating the relation of the invention to the other portions of the plant.

Fig. 2:— is a longitudinal section through the claw and secondary pulsator, on an enlarged scale, showing the internal arrangement, and, Fig. 3:— is an enlarged plan view of the claw with the pulsator removed.

Referring now to Fig. 1, 1 is the primary pulsator which may be of any suitable construction and positioned at any desired position, as for example as here shown, it is mounted upon the side of the vacuum-pump 2 of the plant.

Upon the claw 3 of each set of teat-cups 4, is mounted a secondary pulsator 5 and a suitable system of pipes 6 is employed to connect all the secondary pulsators in the plant with the primary pulsation above mentioned.

The claw 3 (Fig. 3) comprises a body portion having three chambers or recesses, the central or vacuum chamber 7 being in communication with the milk-pipe 8 while the two flanking or pulsation chambers 9 and 10 are in communication with the secondary pulsation as hereinafter explained. Projecting upwardly and outwardly at an angle from the side of the said body portion of the claw are four stumps or short pipes 11 communicating with the central chamber 7 and adapted to receive the flexible tubes 12 connecting with the suction chambers of the teat-cups 4. Similarly projecting from the sides of the said body member are four stumps 13 which are arranged in pairs so as to communicate respectively with the chambers 9 and 10 and adapted to receive the tubes connecting with the pulsation-chambers of the teat cups 4. It will be seen that a claw of this construction will allow of the various flexible connections being led off almost straight to each of the teat-cups, while such construction also permits of thorough cleansing by passing a brush down through the stumps into the chambers in the body portion.

The secondary pulsator 5 (Fig. 2) comprises a cylinder having a plate or base 15 adapted to fit air-tight upon the open upper side of the body portion of the claw 3 and to be clamped in place by means of a stud 16 projecting downwardly from the under side of the plate 15 and adapted to receive a nut 16ª upon the under side of the claw.

The said cylinder comprises two portions, namely, an actuating or motive portion 17 adapted to receive the primary pulsation; and a secondary portion 18, in line therewith and of a smaller diameter. Adapted to reciprocate within the cylinder is a piston 19 suitably stepped to fit the two diameters. The said piston 19 is formed with a hollow core 20 which is closed at the end adjacent to the portion 17 and open at the end adjacent to the portion 18.

Through the plate 15 are formed three ports 21, 22, and 23 communicating between the bore of the cylinder and the chambers 9, 7 and 10 respectively, while such cylinder, at or near the outer end of the portion 18 is provided with one or a plurality of holes or vents 24 communicating between the bore of such portion and the outer air.

Around the periphery of the piston 19 at the portion working in the portion 17 of the cylinder is formed a groove or recess 25, communicating through holes or perforations 26 with the hollow core 20, while around the periphery of the portion of such piston working in the portion 18 of the cylinder is formed a recess 27 extending from the step of the piston for a sufficient distance to bridge the ports 22 and 23 or 22 and 21 according to the position of the piston.

By this arrangement the milk passes from the suction chambers of the teat-cups through the tubes 12 into the central chamber 7 and from thence into the milk-pipe 8. It will be seen therefore that, as it forms a portion of the milk passage, such chamber 7 will be under continuous vacuum, and consequently the port 22 communicating with such chamber will also be under vacuum. As the recess 27 is at all times in communication with the port 22, it will be understood that the inner or step end of the larger portion of the piston will be under vacuum. At the stage in the primary pulsation therefore, at which the portion 17 of the cylinder is placed in communication with the atmosphere, the pressure of the latter acting upon the large end of such piston will cause it to assume the position here shown. In such position of the piston it will be seen that the recess 27 will establish connection between the port 22 and the port 23 thereby placing the chamber 10 and consequently the pulsation chambers of the teat-cups connected therewith, in communication with the vacuum of the milk-pipe. While in this position of the piston also it will be seen that the groove 25 will be in coincidence with the port 21, thus placing the chamber 9, and the pulsation chambers of the teat-cups connected therewith, in communication with the atmospheric pressure.

At the stage in the primary pulsation at which the portion 17 of the cylinder is under vacuum however, the atmospheric pressure acting upon the opposite end and in the hollow core will cause such piston to assume the position indicated in dotted lines. In this position the smaller end of the piston will uncover the port 23 and thus place the chamber 10 and the pulsation chambers of its teat-cups in communication with the atmosphere, while the recess 27 will connect the port 22 with the port 21 and so place the chamber 9 and the pulsation chambers of its teat-cups under vacuum.

It will be understood therefore that, as by this invention the pulsation is produced at the claw, the distance through which such pulsation will require to be transmitted to the teat-cups will be reduced to a minimum and further, as in such pulsation the vacuum is obtained from the milk-pipe at the same point at which the suction connections of the teat-cups are made, it will be seen that the vacuum in the two chambers will be equal. Again, as the teat-cups are pulsated differentially and as such pulsation is produced by means of a vacuum obtained at the claw itself, it will be understood that at the moment when the pulsation chambers are placed under vacuum, the air which such chambers previously contained will, on entering the central vacuum chamber 7 temporarily reduce the vacuum of the latter and so have the double effect of slightly relaxing the suction upon the teat and preventing the sudden action of the squeeze as hereinbefore mentioned.

I claim:

1. In a milking machine of the class described, the combination with a plurality of two-chamber teat-cups, a claw connected with the suction and pulsation chambers thereof, and a milk pipe connected with the claw, of a primary pulsator, and a single secondary pulsator mounted upon the claw and adapted to receive primary pulsations from the primary pulsator and to be actuated thereby to supply secondary pulsations to the outer chambers of the several teat-cups.

2. In a milking machine, the combination with a plurality of two-chamber teat-cups, a claw connected with the suction and pulsation chambers of each cup, and a milk pipe connected with the claw, of a primary pulsator, a single secondary pulsator mounted upon the claw and being adapted to be actuated by a primary pulsation from the primary pulsator to supply secondary pulsations to the teat-cups by placing the pulsation chambers of the latter alternately in communication with the atmosphere and with the vacuum of the milk pipe connection of the claw to momentarily reduce the vacuum in the claw and suction chambers of the teat-cups during each change in the pulsations.

3. In a milking machine of the class described, the combination with a plurality of two-chamber teat-cups, a claw connected with the suction and pulsation chambers thereof, and a milk pipe connected with the claw, of a primary pulsator, a single secondary pulsator mounted upon the claw and adapted to receive primary pulsations from the primary pulsator and to be actuated thereby to supply secondary pulsations to the several teat-cups, and means for momentarily reducing the vacuum in the suction chambers of the teat-cups during each change in the pulsations in the pulsation chambers of the same.

4. In a milking machine of the class described, the combination with a plurality of two-chamber teat-cups, a claw connected with the pulsation and the suction chambers of the said cups, and a milk pipe connected with the claw, of a primary pulsator, and a secondary pulsator mounted upon the claw and being adapted to be actuated by primary pulsations from the primary pulsator to supply a differential secondary pulsation to the teat-cups by placing the pulsation chambers of one pair of such teat-cups in communication with the atmosphere and the pulsation chambers of the other pair in communication with suction, and vice versa.

5. In milking machines of the class described, a claw comprising a body portion, a central chamber formed in such body portion and connected with the milk-pipe, four stumps projecting upwardly and outwardly from the sides of the said body portion and adapted to connect the flexible tubes from the suction chambers of the respective teat-cups with said central chamber, two flanking chambers formed in said body portion and disposed one on either side of said central chamber, and four stumps projecting upwardly and outwardly from the sides of said body portion and adapted to connect the pulsation-chambers of the respective teat-cups two with one of said flanking chambers and two with the other said flanking chambers.

6. In milking machines of the class described, a claw comprising a body portion, a central chamber formed in such body portion and connected with the milk-pipe, four stumps projecting upwardly and outwardly from the sides of the said body portion and adapted to connect the flexible tubes from the suction chambers of the respective teat cups with said central chamber, two flanking chambers formed in said portion and disposed one on either side of said central chamber, and four stumps projecting upwardly and outwardly from the sides of said body portion and adapted to connect the pulsation-chambers of the respective teat-cups two with one of said flanking chambers and two with the other said flanking chamber, in combination with a primary pulsator a secondary pulsator connected with the primary pulsator and being mounted upon the said claw and adapted to be actuated by primary pulsations from the primary pulsator to connect alternately the central chamber with one and then the other of the flanking chambers and in each instance to open the other flanking chamber to the atmosphere.

7. In a milking machine, the combination with two double-chambered teat cups, of a pipe line, means to produce pneumatic pulsations therein, and means controllable by said pneumatic pulsations to create pneumatic pulsations in the inflaters of the two teat cups alternately.

8. In a milking machine, the combination with two double chambered teat cups, of a pipe line, means to produce pneumatic pulsations therein, a valve the operation of which is controlled by said pneumatic pulsations, and ports and passages coöperating with said valve to create pneumatic pulsations in the inflaters of the two teat cups alternately.

9. In a milking machine, the combination with two double-chambered teat cups, of a pipe line, means to produce pneumatic pulsations therein, and means controllable by said pneumatic pulsations to admit air to the inflater of one teat cup while exhausting air from the inflater of the other and vice versa.

10. In a milking machine, the combination with two double-chambered teat cups, of a pipe line, means to produce pneumatic pulsations therein, a valve the operation of which is controlled by said pneumatic pulsations, and ports and passages coöperating with said valve to admit air to the inflater of one teat cup while exhausting air from the inflater of the other and vice versa.

11. In a milking machine, the combination with two double-chambered teat cups, of a pipe line, means to produce pneumatic pulsations therein and to connect the inner chambers of the teat cups with suction, and means controlled by said pneumatic pulsations to create pneumatic pulsations in the inflaters of the two teat cups alternately.

12. In a milking machine, the combination with two double-chambered teat cups, of a pipe line, means to produce pneumatic pulsations therein and to connect the inner chambers of the teat cups with suction, and means controlled by said pneumatic pulsations to admit air to the inflation chamber of one cup while exhausting air from the inflation chamber of the other and vice versa.

13. In a milking machine, the combination with two double chambered teat cups, of a pipe line, means to produce pneumatic pulsations therein and to connect the inner chambers of the teat cups with suction, a valve the operation of which is controlled by said pneumatic pulsations, and ports and passages coöperating with said valve to create pneumatic pulsations in the pulsators of the two teat cups alternately.

14. In a milking machine, the combination with two double-chambered teat cups, of a pipe line, means to produce pneumatic pulsations therein and to connect the inner chambers of the teat cups with suction, a valve the operation of which is controlled by said pneumatic pulsations, and ports and passages coöperating with said valve to admit air to the inflation chamber of one cup while exhausting air from the inflation chamber of the other and vice versa.

15. In a milking machine, the combination with a plurality of two-chambered teat cups, of a vacuum pipe line, pipes connected with the inner teat cup chambers and adapted for connection with the vacuum pipe line, a second pipe line, a primary pulsator adapted to produce pulsations in the second pipe line, and a secondary pulsator connected with the second pipe line and adapted to receive pulsations from the primary pulsator to supply a differential pulsation to the teat cups by placing the pulsation chambers of one pair of said cups in communication with the atmosphere and the pulsation chambers of the other pair in communication with suction, and vice versa.

16. In a milking machine, the combination with two double-chambered teat cups, of a pipe line, a primary pulsator to produce pneumatic pulsations therein, a vacuum line and connections therefrom to the inner chambers of the teat cups, a secondary pulsator the operation of which is controlled by said pneumatic pulsations, and ports and passages coöperating with the secondary pulsator to connect the outer chamber of one teat cup with the atmosphere and the outer chamber of the other teat cup with the vacuum line and vice versa.

17. In a milking machine, the combination with two double chambered teat cups, of a vacuum pipe line, pipes connected with the inner teat cup chambers and adapted for connection with the vacuum pipe line, a second pipe line and means to produce pneumatic pulsations therein, and means controlled by said pneumatic pulsations to create pneumatic pulsations in the inflation chambers of the two teat cups alternately.

18. In a milking machine, the combination with two double chambered teat cups, of a vacuum pipe line, pipes connected with the inner teat cup chambers and adapted for connection with the vacuum pipe line, a second pipe line and means to produce pneumatic pulsations therein, and means controlled by said pneumatic pulsations to admit air to the inflation chamber of the one cup while exhausting air from the inflation chamber of the other, and vice versa.

19. In a milking machine, the combination with two double chambered teat cups, of a vacuum pipe line, pipes connected with the inner teat cup chambers and adapted for connection with the vacuum pipe line, a second pipe line and means to produce pneumatic pulsations therein, a valve the operation of which is controlled by said pneumatic pulsations, and ports and passages coöperating with said valve to create pneumatic pulsations in the inflation chambers of the two teat cups alternately.

20. In a milking machine, the combination with two double chambered teat cups, of a vacuum pipe line, pipes connected with the inner teat cup chamber and adapted for connection with the vacuum pipe line, a second pipe line and means to produce pneumatic pulsations therein, a valve the operation of which is controlled by said pneumatic pulsations, and ports and passages coöperating with said valve to admit air to the inflation chamber of one cup while exhausting air from the inflation chamber of the other and vice versa.

In testimony whereof I have signed my name to this specification in the presence of two subscribing witnesses.

ROBERT BRUCE FORSYTH.

Witnesses:
PERCY RICHMOND CLIMIE,
CYRIL CARLYOW COATES.